(12) United States Patent
Weiden

(10) Patent No.: US 8,940,078 B2
(45) Date of Patent: Jan. 27, 2015

(54) AIR FILTER SENSOR AND ALARM

(71) Applicant: Schneider Electric USA, Inc., Palatine, IL (US)

(72) Inventor: Conrad Weiden, Chapel Hill, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 171 days.

(21) Appl. No.: 13/625,263

(22) Filed: Sep. 24, 2012

(65) Prior Publication Data
US 2014/0083292 A1    Mar. 27, 2014

(51) Int. Cl.
*B01D 46/46*    (2006.01)

(52) U.S. Cl.
USPC ............. 95/23; 55/DIG. 34; 95/25; 96/417; 96/418; 96/419; 96/422

(58) Field of Classification Search
USPC .......... 55/385.1, DIG. 34, 472, 473; 96/424, 96/417, 397, 422; 95/25, 26, 19, 22
See application file for complete search history.

(56) References Cited

U.S. PATENT DOCUMENTS

| 4,747,364 | A | | 5/1988 | Horowitz |
| 5,352,255 | A | | 10/1994 | Taft |
| 5,810,908 | A | * | 9/1998 | Gray et al. ............. 95/25 |
| 5,917,141 | A | | 6/1999 | Naquin, Jr. |
| 6,126,613 | A | * | 10/2000 | Edwards et al. ......... 600/539 |
| 6,190,442 | B1 | | 2/2001 | Redner |
| 6,660,070 | B2 | * | 12/2003 | Chung et al. ........... 96/424 |
| 6,790,257 | B2 | * | 9/2004 | Jeng et al. .............. 95/19 |
| 8,312,873 | B2 | * | 11/2012 | Gagas et al. ........... 126/299 D |
| 2003/0070544 | A1 | * | 4/2003 | Mulvaney et al. ....... 95/25 |
| 2010/0269537 | A1 | * | 10/2010 | Tadokoro et al. ........ 62/426 |
| 2010/0327592 | A1 | * | 12/2010 | Boot .................. 290/52 |
| 2011/0209611 | A1 | * | 9/2011 | Kruglick .............. 95/64 |

* cited by examiner

*Primary Examiner* — Duane Smith
*Assistant Examiner* — Minh-Chau Pham
(74) *Attorney, Agent, or Firm* — Locke Lord LLP

(57) ABSTRACT

A filter sensor to monitor an air filter in an air conditioning system is disclosed. The filter sensor includes a housing having an interior passage. The housing is located in relation to an air vent of the air conditioning system. A propeller is mounted in the interior passage. The propeller is rotated by the filtered air flow of the air conditioning system. A motion sensor is provided in proximity to the propeller or its shaft. A controller is coupled to the motion sensor to determine the rotational speed of the propeller and correlate the rotational speed of the propeller with the condition of the filter. An indicator is coupled to the controller to indicate a status of the air filter.

20 Claims, 4 Drawing Sheets

AIR FILTER SENSOR AND ALARM

TECHNICAL FIELD

The present disclosure relates generally to the determining the status of an air conditioning unit and in particular, to a device for determining whether a filter for an air conditioning unit is functioning efficiently.

BACKGROUND

As is well-known, air conditioning units are part of heating, ventilation, and air conditioning ("HVAC") systems in buildings. Air conditioning systems have a number of air vents and operate by drawing in air for cooling via a return or intake air duct. The air drawn in via the intake air intake and directed toward a filter that filters out undesired particles from air flow in order to maintain air quality. The air is then run through a heat exchange device such as a compressor to output filtered and cooled air. However, a filter may affect the operation of an air conditioning unit via the flow rate of the air input to the system. For example, a filter that is saturated with trapped particles can impede air flow thus requiring greater power to operate and or restricting the amount of air that can be cooled.

For larger industrial HVAC systems, sensors are built into the HVAC system to provide alerts when clogged filters begin to impede operations of the system. However, many air conditioning systems are smaller scale and do not include sensors that detect the state of the filters. For example, in air conditioning systems for home use such as a window mounted air conditioning unit, no filter sensor is typically provided. Currently, it is difficult to determine whether a filter is impeding the operation of such an air conditioning unit and therefore must be cleaned or replaced. This is especially the case for smaller scale air conditioning units where cleaning or replacement of the filter is often ignored. Thus, energy efficiency as well as cooling capability is decreased as operation continues of the air conditioning unit and the filter traps more particles.

Thus, there is a need for a sensing device that will indicate when the filter on a specific air handling system is dirty and needs to be changed or cleaned. There is also a need for a device that is portable and may be employed by a user who does not have an internal air handling control that can monitor the condition of the filter in an air conditioning system. There is also a need for a device that provides the user with a precise indication of the condition of the filter on an air conditioning unit. There is a further need for a device that will not sound at night or other undesirable times when the user would not want to be disturbed if a filter is clogged.

SUMMARY

According to at least some aspects of the present disclosure, a filter sensor to monitor an air filter in an air conditioning system is disclosed. The filter sensor includes a housing having an interior passage. The housing is located in relation to an air vent of the air conditioning system. A propeller is mounted in the interior passage. The propeller is rotated by the air flow through the air conditioning system. A motion sensor is provided to sense the propeller rotation. A controller is coupled to the motion sensor to determine the rotational speed of the propeller and correlate the rotational speed of the propeller with the condition of the filter in the air conditioning system. An indicator is coupled to the controller to indicate the status of the air filter.

Another disclosed example is a method of determining the status of an air filter of an air conditioning system with an air vent. A filter sensor having a housing holding a propeller is attached in proximity of the air conditioning system. The rotational speed of the propeller is sensed. The air flow through the air conditioning system is determined based on the rotational speed of the propeller. An indication of the status of the air filter based on the determined air flow is provided.

The air conditioning filter sensor allows an inexpensive alternative to monitor the condition of an air filter on an air conditioning unit. The filter sensor is portable and may be reused with another air conditioning unit. The filter sensor allows a user to delay the alerts if an adverse filter condition is sensed during the night time.

Additional aspects will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

Figure 1:
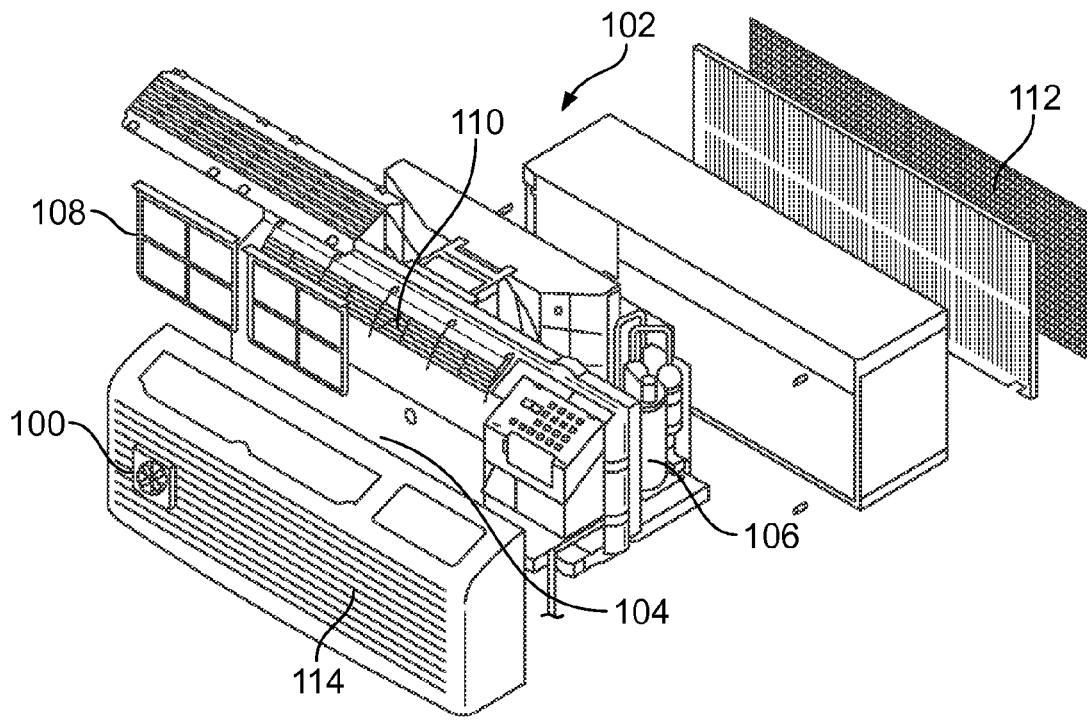
FIG. 1 is a perspective exploded view of an air conditioning unit and a filter sensor according to the examples described herein.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a perspective exploded view of a filter sensor 100 that is attached to an air conditioning unit 102. The air conditioning unit 102 in this example is a window mounted unit but other types of air conditioning units may use the filter sensor 100. As will be explained below, the filter sensor 100 is portable and may be moved to another air conditioning unit. The air conditioning unit 102 includes an air intake duct 104, a compressor 106, an air filter 108 and a cool air output vent 110 and an exhaust output vent 112. A grill 114 is mounted over the air intake duct 104 and the air output vent 110 to direct the air flowing in and out of the air conditioning unit 102. The air filter 108 is located behind the air intake duct 104 and traps undesirable particles from air brought in through the air intake duct 104. As may be seen in FIG. 1, the filter sensor 100 is attached to the grill 114 over the air intake duct 104 to measure the effect of particles trapped by the air filter 108 on the operation of air flow to the air conditioning unit 102. As is generally understood, the air conditioning unit 102 circulates air from the air intake duct 104 and the compressor 106 removes heat from the air resulting in cooler air output by the cool air output 112. A fan motor (not shown) circulates air to the various components of the air conditioning unit.

As will be explained in greater detail below, the filter sensor 100 monitors the air filter 108 by detecting air flow rate of air in the air conditioning unit 102 by measuring air flow through air vents such as the air intake 104, the air output 110 or the cool air output 112. When the filter 108 becomes clogged with particles and begins to effect functioning of the air conditioning unit 102, the air flow rate will decrease and the filter sensor 100 indicates this decrease in performance thereby providing a warning to clean or replace the filter 108. The filter sensor 100 includes an alarm that will indicate to a user when the filter on a specific air handling system such as the air conditioning unit 102 is dirty and needs to be changed or cleaned. It also includes an alarm control that will not sound the alarm at night when the user would not want to be disturbed.

Figure 2A:
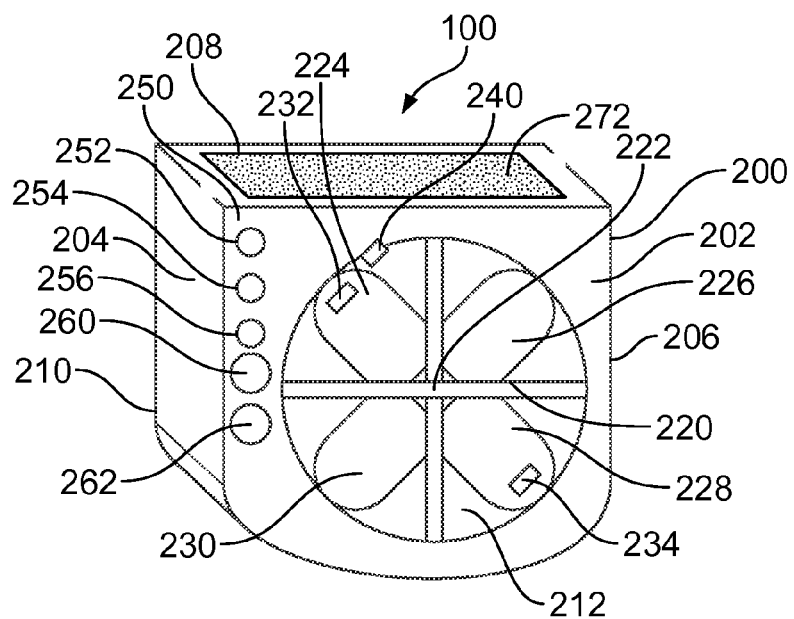
FIG. 2A is a close up perspective front view of the air conditioning filter sensor in FIG. 1.
Figure 2B:
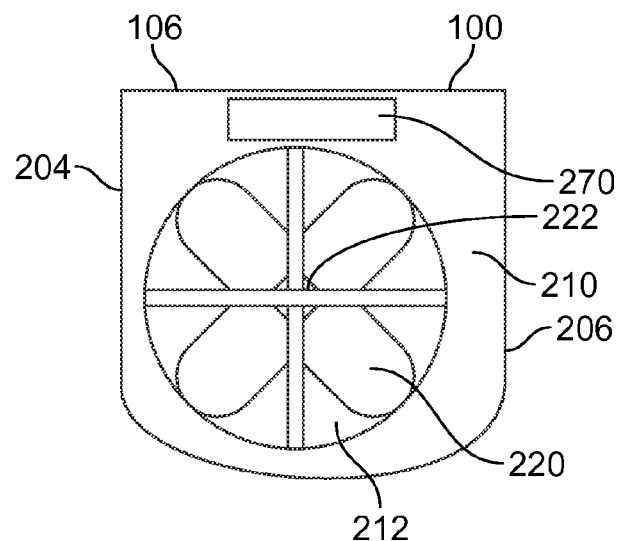
FIG. 2B is a view of the back panel of the air conditioning filter sensor in FIG. 1.

FIG. 2A is a close up front perspective view of the filter sensor 100 in FIG. 1 and FIG. 2B is a back view of the filter sensor 100 in FIG. 1. The filter sensor 100 includes a housing 200 that contains the mechanical and electronic components as will be explained below. The housing 200 includes a front plate 202, side surfaces 204 and 206, a top panel 208 and a back plate 210. The front plate 202 of the housing 200 includes an interior through passage 212 that holds a propeller 220 that is mounted on a lateral shaft 222.

The propeller 220 in this example includes four blades 224, 226, 228 and 230 that are equally angled from the shaft 222 and propelled by air flow passing through the interior through passage 212. As shown in FIG. 1, since the filter sensor 100 is located in relation to an air vent such as the air intake 104, air brought through the air intake 104 moves through the interior through passage 212. The propeller blades 224, 226, 228 and 230 rotate the shaft 222 when air flows through the air intake 104 of the air conditioning unit 102. A magnet 232 is mounted on the outside edge of the blade 224 and a second magnet 234 is mounted on the outside edge of the opposite blade 228. A magnetic motion sensor 240 is mounted on the front plate 202 to detect the proximity of the magnets 232 and 234 and therefore provide an output signal indicative of the rotational speed of the propeller 220 based on the frequency that the magnets 232 and 234 are detected as they move in proximity of the sensor 240. Of course, it is to be understood other types of sensors may be used such as an optical sensor or a shaft encoder with magnets on the shaft 222 and corresponding Hall sensors, to detect the rotational motion of the propeller 220 by detecting the rotational speed of the propeller blades 224, 226, 228 and 230 or the shaft 222.

The front plate 202 includes a control panel 250 that has indicators and controls for the filter sensor 100. The indicators indicate the status of the air filter 108. The control panel 250 in this example includes three LEDs 252, 254, and 256. In this example, the LED 252 is a red LED, the LED 254 is a yellow LED and the LED 256 is a green LED. Of course other display devices such as an LCD, video screen, other colors and numbers of LEDs, etc. may be used to assist a user in showing the status of the filter 108 detected by the filter sensor 100. The control panel 250 also includes a setup button 260 and an alarm indicator 262. In this example, the alarm indicator 262 is an audio device such as a beeper. Of course, other audio devices may be used for the alarm indicator 262. Also a visual indicator may be used in conjunction with the audio alarm or in place of the audio alarm.

In this example, the magnets 232 and 234 mounted on the outside edges of the propeller blades 224 and 226 interface with the magnetic sensor 240 which is in communication with a controller that can determine the rotational speed of the propeller 220 based on the signal from the magnetic sensor 240. The rotational speed of the propeller 220 is proportional to the air flow drawn into the air conditioning unit 102, and thus, the flow rate of air that is passing through the filter 108 and therefore the air intake duct 104. As will be explained below, the controller correlates the rotational speed of the propeller 220 with the condition of the air filter 108. The rotation of the propeller 220 can also be used to generate power for the electronic components of the filter sensor 100 if a small AC generator is included within the housing 200.

When the filter alarm sensor 100 is installed along with a new or cleaned filter such as the filter 108 on an air conditioning unit such as the air conditioning unit 102 in FIG. 1, the filter sensor 100 must be setup for the specific air conditioning unit. In this example, the setup of the sensor 100 is initiated by pushing the setup button 260 on the control panel 250 after the air conditioning unit 102 is running and the propeller 220 is spinning at a steady state speed establishing that air intake to the air conditioning unit 102 is constant. When the setup button 260 is pushed the sensor 100 is activated. The level for which the alarm indicator 262 will indicate that air flow has been restricted enough to require replacement or cleaning of the filter 108 is set at an automatic level when the setup button 260 is pushed as will be explained below.

The alarm level may also be settable either in the factory or by a user. The alarm level is based on percent reduction of air flow through the filter 108 that is obtained by the speed of the spinning propeller 220. For example, when the alarm level is initially set with a new or clean filter, the filter alarm sensor 100 will assume that the speed of the spinning propeller 220 is equivalent to the maximum air flow through the air conditioning unit 102 and that the airflow would be considered zero when the propeller 220 is not spinning. When the speed of the propeller 220 is reduced to a speed that would be equivalent a 35% reduction in air flow through the system, then the alarm indicator 262 is activated. If the user chooses to delay the alarm, an additional calculated 5% reduction in air flow could be added to the alarm level by the delay action. As explained below, the delay could also be based on a time delay in days or hours. The air filter sensor 100 may also have a bottom level for delay, for example a maximum reduction of 50% in airflow in which the delay can no longer be added. This would be done so as to protect the fan motor of the air conditioning unit 102 from damage due to overuse.

Indication of the operation of the filter 108 in this example is made by the LEDs 252, 254 and 256 blinking. In this example, all of the LEDs 252, 254 and 256 blink while the filter sensor 100 is being setup. After setup, the green LED 256 blinks to indicate good air flow with normal operation of the air filter 108. When the yellow LED 254 blinks, it indicates a delay in triggering the alarm such as during the night time or if the user overrides the alarm. The red LED 252 blinks to indicate the need to replace or clean the air filter 108. The filter sensor 100 can also be set to make an audio indication of the state of the filter via the alarm indicator 262. For example, the alarm indicator 262 could be set to sound in proportion to the state of the filter. The audio indication of the alarm indicator 262 could be associated with the inputs from a solar cell so that alarm would not activate in the dark (night time) and thus not disturb the user during undesirable times.

The back plate 210 includes a clip 270 that is attachable to the grill 114 in front of the air intake duct 104 of the air conditioning unit 102 in FIG. 1. The clip 270 may be a mechanical device that interfaces with the grill or alternatively a magnet that attaches the filter sensor 100 to a metal grill. The top panel 208 includes a solar panel 272 that provides additional power or primary power to the filter sensor 100. The solar panel 272 may also be used to sense whether the filter is operating during the day or night.

Figure 3:
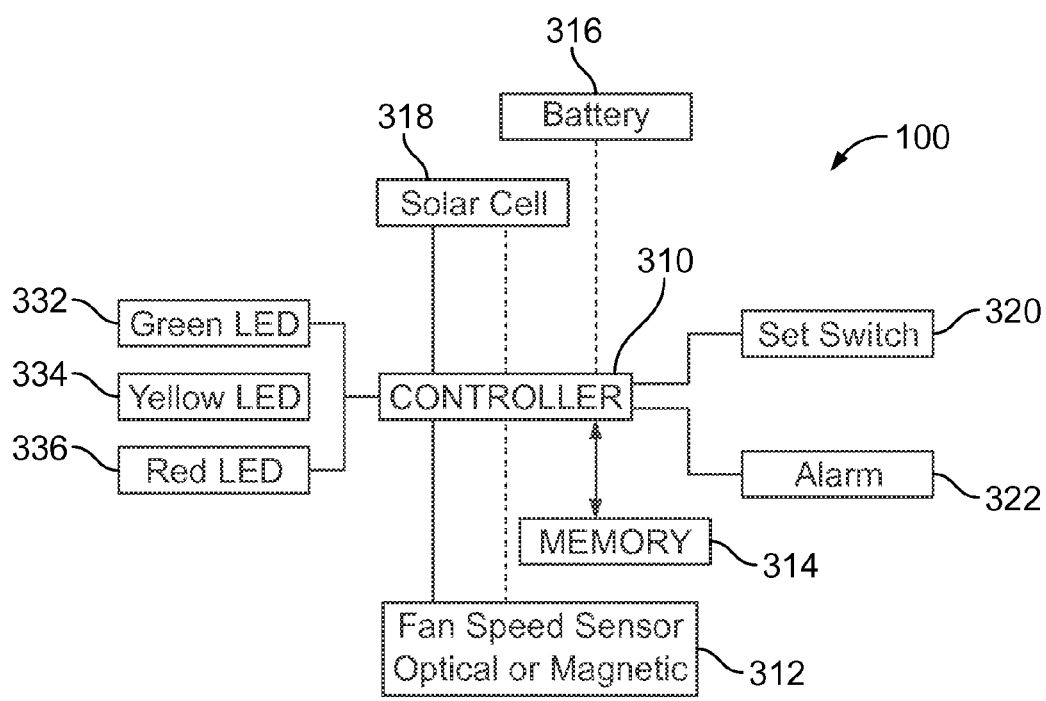
FIG. 3 is a block diagram of the electronic components of the filter sensor in FIG. 2A.

FIG. 3 is a block diagram of the internal electronic components of the filter sensor 100. As shown in FIG. 3, the filter sensor 100 includes a controller 310, a fan speed sensor input 312, a memory 314, a battery 316, a solar cell interface 318, a set switch input 320, and an alarm output 322. The controller 310 may be a microprocessor, a microcontroller, a processor, an application specific integrated circuit (ASIC), a programmable logic device (PLD), a field programmable logic device (FPLD), a field programmable gate array (FPGA), discrete logic, etc. or any other similar device. The memory 314 may include hardware, firmware, or tangible machine-readable storage media that store instructions and data for performing the operations described herein. Machine-readable storage media includes any mechanism that stores information and provides the information in a form readable by a machine. For example, machine-readable storage media includes read only memory (ROM), random access memory (RAM), magnetic disk storage media, optical storage media, flash memory, etc.

The controller 310 also includes three LED outputs 332, 334 and 336 providing control of power to the LEDs 252, 254 and 256 and therefore allowing the LEDs 252, 254 and 256 to be controlled to light or blink. The controller 310 receives rotational data from the fan speed sensor input 312 coupled to the sensor 240 that indicates the speed of the propeller 220 in FIG. 2A. The controller 310 runs an algorithm stored in the memory 314 to determine the air flow of the air conditioning unit 102 based on the rotational speed data received from the fan speed sensor input 312. The controller 310 determines whether the calculated air flow value is within the predetermined parameters of expected operations of the air conditioning unit 102. In this example, the controller 310 performs the checks of the air flow on a continuous basis while the air conditioning unit 102 is operating.

The controller 310 and the other components in FIG. 3 are powered via the battery 316. Additional power may be obtained via the solar cell interface 318 which is coupled to the solar cell 272 in FIG. 2A. The controller 310 obtains input signals from the set switch input 320 which is coupled to the setup button 260 in FIG. 2A. The controller 310 controls the alarm indicator 262 in FIG. 2A via an alarm output 322. The controller 310 therefore determines whether to activate the alarm indicator 262 via the alarm output 322 when the sensed rotational speed falls below a threshold level and whether the drop occurs during a non-sleep period.

The controller 310 also operates according to the algorithm to cause the LEDs 252, 254 and 256 in FIG. 2A to blink or otherwise indicate different filter conditions and the setting of various functions. The controller 310 outputs signals via the LED outputs 332, 334 and 336.

Figure 4:
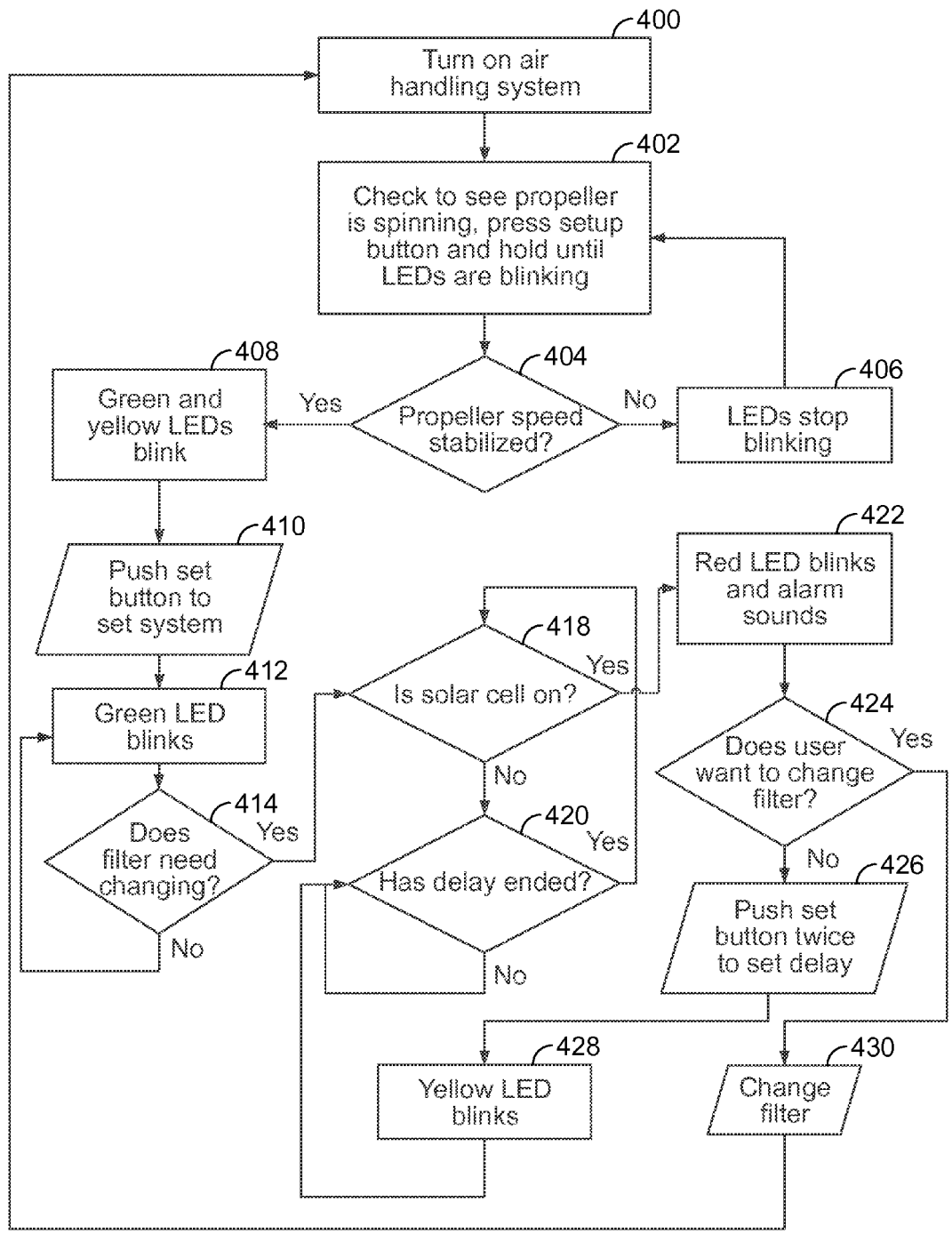
FIG. 4 is flow diagram of the control process used by the filter sensor in FIG. 2A to determine whether the filter in the air conditioning unit in FIG. 1 needs to be cleaned or replaced.

The operation of the example process to estimate and display energy savings shown in FIGS. 1-3, which can be run on the controller 310, will now be described with reference to FIGS. 1-3 in conjunction with the flow diagram shown in FIG. 4. The flow diagram in FIG. 4 is representative of example machine-readable instructions for implementing the processes described above to monitor the filter of an air conditioning system such as the air conditioning unit 102. In this example, the machine readable instructions comprise an algorithm for execution by: (a) a processor, (b) a controller, or (c) one or more other suitable processing device(s). The algorithm can be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the controller 310 in FIG. 3 could be implemented by software, hardware, and/or firmware. Also, some or all of the machine readable instructions represented by the flowchart of FIG. 4 can be implemented manually. Further, although the example algorithm is described with reference to the flowchart illustrated in FIG. 4, persons of ordinary skill in the art will readily appreciate that many other methods of implementing the example machine readable instructions can alternatively be used. For example, the order of execution of the blocks can be changed, and/or some of the blocks described can be changed, eliminated, or combined.

Initially, when the filter sensor 100 is attached to the air conditioning unit 102 in relation to a vent such as the air intake 104, the air conditioning unit 102 is turned on which results in air being pulled in from the air intake 104 in FIG. 1 (400). An input is received from the setup input 320 which indicates that the setup button 260 has been pushed to initiate the filter monitoring routine (402). During this time, the controller 310 reads inputs from the fan speed sensor input 312 to determine that the propeller 220 is rotating. During the initialization phase, the controller 310 causes the LEDs 252, 254 and 256 to blink in response to the user holding the setup button 260 down for a sufficient time to monitor the inputs from the sensor 240. After the LEDs 252, 254 and 256 start blinking, the controller 310 continuously monitors the input from the sensor 240 to determine whether the propeller 220 has been rotating constantly for a sufficient period of time to provide a stable speed (404). After a certain period of time, if the propeller 220 does not rotate at a stable speed, the controller 310 causes the LEDs 252, 254 and 256 to stop blinking indicating that the sensor 100 cannot function properly (406). The controller 310 will then loop back and continue to check the rotational speed of the propeller 220 (402). The initialization process occurs each time the filter sensor 100 is attached to a different air conditioning unit as different air conditioning units may have different filters.

If the rotational speed of the propeller 220 is stable, the controller 310 will provide an indication of the stable speed by causing only the green and yellow LEDs 252 and 254 to blink via the LED outputs 332 and 334 (408). The blinking LEDs 252 and 254 indicate to the user that the unit is ready to begin operation. The user initiates the operation of the filter sensor 100 by pressing the setup button 260 (410). Once the setup button 260 is pushed, the controller 310 controls the monitoring of the propeller 220 and causes the green LED 252 to blink indicating normal operation (412). The rotational speed corresponding to a properly functioning air conditioning unit is used by the controller 310 to calculate the alarm value which is stored in the memory 314.

The controller 310 then takes periodic readings of the rotation of the propeller 220. The controller 310 determines the rotational speed of the propeller and correlates the rotational speed of the propeller with the condition of the air filter 108. The condition of the air filter 108 is therefore determined by comparing the readings with threshold values to determine the condition of the air filter 108 (414). If the rotational speed is not below the threshold level, the algorithm loops back and continues to monitor the speed of the propeller 220 and maintain the green LED 252 as blinking (412). If the rotational speed of the propeller 220 falls below the threshold value indicating insufficient air flow, the algorithm will determine whether the solar cell 272 is emitting power (418). In this example, the controller 310 determines whether the time period is an undesirable time by determining whether the solar cell 272 is functioning thereby corresponding to operation during day time (418). If the time period is undesirable such as during evening hours, the controller 310 does not trigger the alarm and delays the triggering of the alarm for a set period of time. The controller 310 then checks on a periodic basis whether the delay has ended (420). If the delay has not ended, the controller 310 loops back and continues to check whether the delay has ended. If the delay period has ended, the controller 310 returns to determine whether power is being received from the solar cell 272 (418).

If the alert occurs during the daytime, the controller 310 causes the red LED 256 to blink and sends a signal on the alarm output 322 to trigger the alarm indicator 262 to alert a user that the filter 108 should be replaced or cleaned (422). The user of the air conditioning unit 102 may then determine whether to replace or clean the air filter (424). If the user decides not to change the filter at the current time, the user may push the setup button 260 twice to set a delay time to trigger the alarm indicator 262 later (426). The input from the setup button 260 is received by the controller 310 which causes the yellow LED 254 to blink via the LED output 334 thereby indicating an alarm delay (426). The algorithm then periodically determines whether the delay has ended (420). If the user changes the filter (430), the algorithm loops back to initiate the settings of the sensor 100 to monitor the air conditioning unit 102 with the new filter as the new filter may have different characteristics than the old filter (402).

Figure 5A:
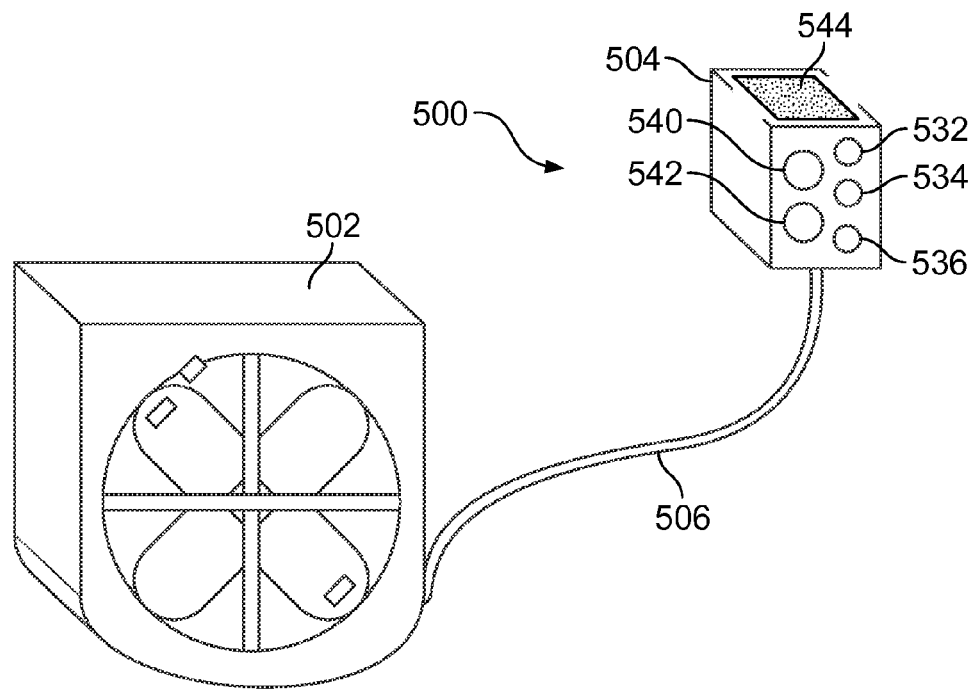
FIG. 5A is a close up perspective view of an air conditioning filter sensor with a remote control unit.

Although the examples discussed above have a single device that attaches to the air conditioning unit, various components may be located remotely from the propeller assembly for the convenience of the user or in cases where the air conditioning unit is located in a remote area such as in a corner high up on a wall, and therefore an attached solar cell cannot accurately read whether it is during the day or night. For example, the control panel having the LEDs and the solar panel may be located remotely from the propeller. An example of a filter sensor system 500 having a remote control may be shown in FIG. 5A. The filter sensor system 500 includes a propeller housing unit 502 that is attached to an air conditioning unit similar to the air conditioning unit 102 in FIG. 1. The filter sensor system 500 also includes a remote control unit 504 that is coupled to the propeller housing unit 502 by a wire 506. The output signals from the motion sensor for the propeller on the propeller housing unit 502 are communicated to the remote control unit 504 via the wire 506. In this manner, the remote control unit 504 may be placed anywhere in proximity of the air conditioning unit that is convenient to the user and/or in exposure to natural daylight to assist in the alarm delay functions explained above. The remote control unit 504 in this example includes green, yellow and red LEDs 532, 534, and 536, a setup button 540 and an alarm indicator 542 similar to those in FIG. 2. The functioning of the LEDs 532, 534, and 536, the setup button 540 and the alarm indicator 542 are identical to their counterparts in FIG. 2A-2B as explained above. A solar cell 544 is attached to the remote control unit 504 to act as a daylight sensor and/or to provide additional power to the remote control unit 504.

Figure 5B:
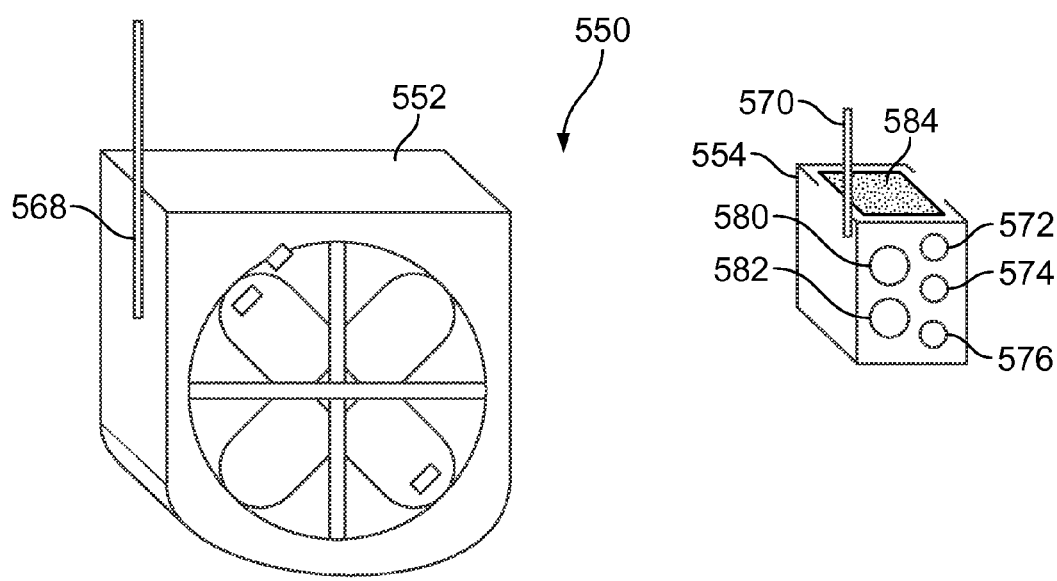
FIG. 5B is a close up perspective view of an air conditioning filter sensor with a wireless remote control unit.

FIG. 5B shows another remotely controlled filter sensor system 550. The filter sensor system 550 includes a propeller housing unit 552 that is attached to an air conditioning unit similar to the air conditioning unit 102 in FIG. 1. The filter sensor system 550 also includes a remote control unit 554 that communicates wirelessly with the propeller housing unit 552. The output signals from the sensor on the propeller housing unit 252 are transmitted to the remote control unit 554 via an antenna 568. In this manner, the remote control unit 554 may be placed anywhere in proximity of the air conditioning unit (and propeller housing 552) that is convenient to the user and/or in exposure to natural daylight to assist in the alarm delay functions explained above. The signals from the antenna 568 on the propeller assembly 552 are received by an antenna 570 attached to the remote control unit 554.

The remote control unit 554 in this example includes green, red and yellow LEDs 572, 574, and 576. The remote control unit 554 also includes a setup button 580 and an alarm indicator 582. In this example, the alarm indicator 582 is an audio device such as a beeper. The functioning of the LEDs 572, 574, and 576, the setup button 580 and the alarm indicator 582 are identical to their counterparts in FIG. 2A-2B as explained above.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A filter sensor to monitor an air filter in an air conditioning system, comprising:
    a housing having an interior passage, the housing located in relation to an air vent of the air conditioning system;
    a propeller mounted in the interior passage, the propeller rotated by air flow through the air conditioning system;
    a motion sensor to sense the rotation of the propeller;
    a controller in communication with the motion sensor to determine the rotational speed of the propeller and correlate the rotational speed of the propeller with the condition of the air filter in the air conditioning system; and
    an indicator coupled to the controller to indicate the status of the air filter.

2. The filter sensor of claim 1, wherein the motion sensor is a magnetic sensor and the propeller includes a magnet.

3. The filter sensor of claim 1, further comprising a clip to attach the housing to the air conditioning system.

4. The filter sensor of claim 1, wherein the indicator includes an LED to indicate the status of the air filter on the air conditioning system.

5. The filter sensor of claim 1, wherein the indicator is an alarm coupled to the controller.

6. The filter sensor of claim 1, wherein the controller determines the condition of the air filter by determining the air flow based on the rotational speed of the propeller and comparing the air flow with a predetermined threshold value.

7. The filter sensor of claim 6, wherein the controller determines the threshold value by measuring the propeller rotational speed when the air conditioning system reaches an initial steady level of operation.

8. The filter sensor of claim 1, further comprising a solar cell coupled to the controller.

9. The filter sensor of claim 8, wherein the controller overrides the indicator if the air conditioning system is operating during a night time period based on the output of the solar cell.

10. The filter sensor of claim 1, further comprising a transmitter coupled to the motion sensor; and a receiver coupled to the controller, the transmitter sending a signal indicative of the motion sensor output to the receiver, wherein the controller is located remotely from the propeller and the motion sensor.

11. A method of determining the status of an air filter of an air conditioning system, comprising:
    attaching a filter sensor having a housing holding a propeller in proximity of an air vent on the air conditioning system, the propeller being rotated by air flow through the air conditioning system;
    sensing the rotational speed of the propeller;
    determining the air flow through the air vent based on the rotational speed of the propeller; and
    providing an indication of the status of the air filter based on the determined air flow.

12. The method of claim 11, wherein the rotational speed is sensed by a magnetic sensor and the propeller includes a magnet.

13. The method of claim 11, wherein the filter sensor is detachable from the air conditioning system.

14. The method of claim 11, wherein the indication is provided by a visual indicator.

15. The method of claim 14, further comprising accepting an input to delay triggering an audio alarm.

16. The method of claim 11, wherein the indication is provided by an audio alarm.

17. The method of claim 11, wherein the status of the air filter is determined by calculating the air flow based on the rotational speed of the propeller and comparing the air flow with a predetermined threshold value.

18. The method of claim 16, further comprising determining the threshold value by measuring the propeller rotational speed when the air conditioning system reaches an initial steady level of operation.

19. The method of claim 11, further comprising:
    sensing the output of a solar cell; and
    overriding providing an indication if the air conditioning system is operating during a night time period based on the output of the solar cell.

20. The method of claim 11, wherein a signal indicative of the rotational speed of the propeller is transmitted wirelessly to a receiver located remotely from the propeller.

* * * * *